May 7, 1935.    G. E. LATHROP    2,000,342
CONFECTION AND METHOD OF MAKING SAME
Filed June 25, 1931
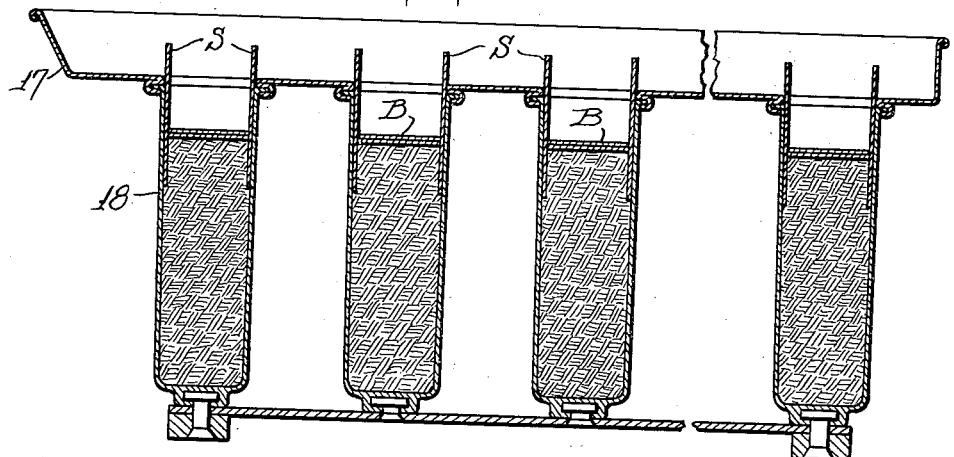
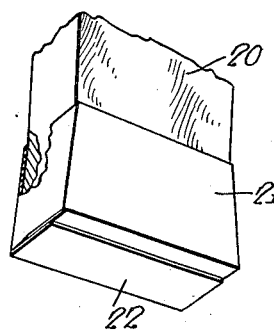
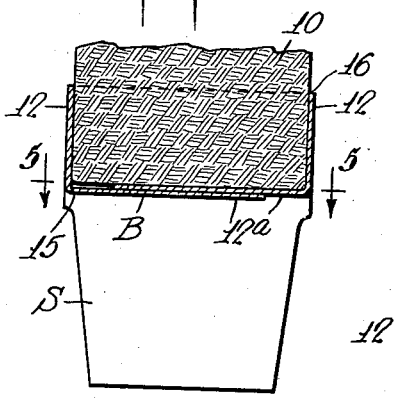
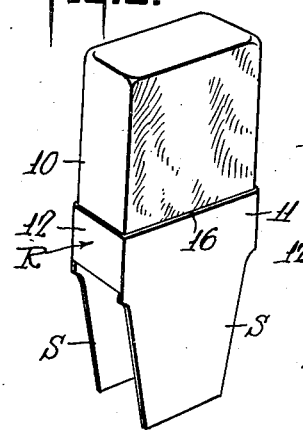
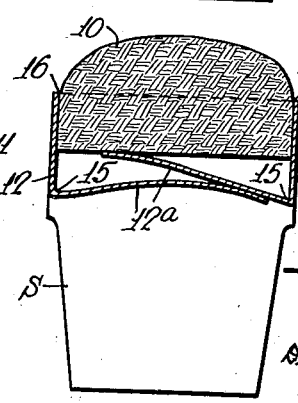
INVENTOR
George E. Lathrop
BY
Dean, Fairbanks, Hirsch & Foster
ATTORNEYS Patented May 7, 1935

2,000,342

UNITED STATES PATENT OFFICE 2,000,342

CONFECTION AND METHOD OF MAKING SAME

George E. Lathrop, Louisville, Ky., assignor, by mesne assignments, to The Popsicle Corporation of the United States, New York, N. Y., a corporation of Delaware Application June 25, 1931, Serial No. 546,901

5 Claims. (Cl. 206—56)

While the present invention relates generally to confections, it is particularly concerned with handled, frozen or super cooled confections, and provides, as a new article of manufacture, a handled confection, a handle for such confection, and a method of forming the confection.

It is among the objects of the invention to provide a frozen confection of the general character described in the prior patent to Epperson, 1,505,592, dated August 19, 1924, in which certain teachings of the Epperson invention are utilized in conjunction with improved handle means by which the confection may be consumed or eaten without soiling the fingers or wasting the substance of the confection.

Another object is to provide a confection including a manipulating handle which encompasses, embraces and supports the confection therein, and which provides confection to handle contact over large areas to efficient frictional retention of the confection within the handle, whereby mechanical engagement and retention of the confection is provided in addition to frozen bonding of the confection with the handle, as set forth in the prior patent above referred to.

Another object is to provide a handled confection embodying an encompassing support which will act to prevent dripping or spilling of the confection from the handle and thus avoid wasting of the confection compound and prevent soiling or staining of the fingers or clothing.

Another object is to provide a confection embodying a handle which receives therein a portion of the confection and which further provides for the gradual manipulated discharge of confection from within the handle so that all the confection may be consumed and none will be wasted.

Another object is to provide a handled confection, the handle of which forms a confection receiving receptacle and extends outwardly therefrom to form gripping means removed from the confection in such a manner as to provide for sanitary handling of the confection and consumption thereof without soiling of the consumer's fingers.

Another object is to provide a handle for confections which constitutes a confection receptacle adapted to receive therein a portion of the confection and to retain the confection therein so that ease and facility of handling and consuming of the confection is effected.

Another object is to provide a confection handle which may be formed of inexpensive and easily destroyed material. The destructibility of the handle provides ease in disposing of a discarded handle, which may be burned or otherwise disposed of to avoid unsanitary and unsightly litter.

Another object is to provide a confection handle which may be formed by cutting and bending paper or a similar material from a blank of such material. By reference to the method employed, it will be seen that the handle may be conveniently applied to provide maximum handling efficiency at a minimum cost of either material or labor.

Another object is to provide a confection handle formed of paper or the like, which will present a large surface area for use as advertising space or for the printing thereon of equivalent data.

Another object is to provide confection receptacles which will receive and securely retain the confection therein by mechanical configuration and interfitting, and which will in itself provide a handle or equivalent gripping means.

Another object is to provide a method of forming frozen or super cooled handled confections, which avoids the necessity of weighting or specifically centering the handle within the material of confection and which will yet provide the proper and accurate centering of the handle in the confection, and in which the handle will be securely held thereto.

Another object is to provide a method for forming handled confections in which the confection mold assists in the aligning and securing of the handle in position with respect to the material of the confection, whereby congelation of the confection material will provide for bonding of the handle to the material.

Another object is to provide a handled confection, a handle for confection, and a method of forming the handled confection, all of which provide the foregoing desiderata in a simple, efficient, inexpensive, and highly sanitary manner, which is particularly adapted to the demands of the manufacturer and consumer in this particular field.

While the present invention is in its broader sense applicable to, and modifiable for, association with various types of confections, both frozen and otherwise, it is particularly designed for use with frozen confections of the type disclosed in the above mentioned patent. The confection comprises a body, the lower end of which is received within a receptacle handle, to which the confection is preferably bonded through freezing of the confection thereto. The handle is preferably cut, bent, and formed from paper or card board, or equivalent printable, easily destroyable and easily handled material, the blank of which is folded and secured, as by pasting, in rectangular configuration, two of the sides being folded inwardly to constitute the bottom of the handle receptacle. The bottom pieces are retained merely by folding and may be forced by finger manipulation to eject the stub of the confection from the receptacle handle during its consumption. The opposite sides extend outwardly to form wide gripping surfaces which provide large advertising surfaces.

In forming the confection, a preferred method employs molds in which the confection material is poured while in a liquid state. The handles are inserted within the molds prior to the final freezing of the confection. Upon freezing, the handle and confection material are intimately bonded. Expansion of the confection material during freezing will act to provide a strong friction bond between the confection and handle. The use of unglazed or porous handle material will provide impregnation or equivalent entrance of material into the interstices of the handle, thus to more firmly and intimately unite the handle with the confection material by freezing. The receptacle portion of the handle snugly engages the mold walls to prevent confection material from being frozen on to the outer surface of the handle. The gripping means extend upwardly from the mold to be used in removing the finished confection. Accurate centering of the handles is provided by their fit in the molds, thus they are retained in proper position without utilizing specific centering or stick retaining means such as is usually required in the practice of inventions of this character.

In the accompanying drawing, in which is shown one of various possible embodiments of the several features of the invention, Fig. 1 is a longitudinal section of a preferred type of mold, with the confection material and the handle members in position ready for congelation.

Fig. 2 is a perspective view of the confection formed in accordance with the present invention.

Fig. 3 is a vertical section illustrating the position of the confection within the handle.

Fig. 4 is a view similar to Fig. 3, illustrating the manner in which the end of the confection may be projected from the handle.

Fig. 5 is a section taken on the line 5—5 of Fig. 3.

Fig. 6 is a plan view of the blank from which the handle is formed, and

Fig. 7 is a perspective view of a confection formed in accordance with a modification of the invention.

While the present invention is applicable to various types of confections, frozen or non-frozen, it specifically contemplates the use of a frozen confection as disclosed in the Epperson patent hereinbefore referred to.

As shown in Fig. 2, a block 10 of such confection is received within the upper receptacle portion R of a paper or card board handle which entirely surrounds the lower end of the confection and snugly embraces it, providing a large confection contacting area which is bonded therewith either by friction, as by expansion of the confection during freezing, or through a pure frozen bond as by impregnation or equivalent. From the receptacle portion R, the sides S extend outwardly to form grasping tabs of sufficient area to provide advertising surfaces, and by which the confection may be manipulated and consumed without direct contact of the fingers with the confection. The preferred paper material of the handle provides not only ease in destroying litter formed by their disposal, but renders discarded handles easily picked up either by sweeping or by picking-sticks as usual in collecting discarded paper. The handles are formed from blanks (Fig. 6) having side forming sections 11 and end forming sections 12. The ends and sides are foldable along the lines 13 to form the receptacle portion R. The invention is obviously not confined to the rectangular configuration illustrated, and modifications of the blank used will readily suggest themselves to those skilled in the art. The blank includes a securing tab 14, which may be pasted or otherwise secured to the side 11 of the opposite end of the blank to secure the handle in folded position. The bottom of the receptacle is formed by end extensions 12a which are foldable along the lines 15 to lie at right angles with the sides and the ends, as shown at B in Figs. 1 and 3. The members 12a are retained in their bottom forming position merely by creasing along their fold lines 15. When the confection is consumed down to the proximity of the upper edge 16 of the receptacle, the bottom may be forced upwardly by the consumer's finger, as indicated in Fig. 4, and the stub portion of the confection is projected from the receptacle as required by the consumer and without danger of spilling or dripping the substance of the confection from the handle.

In the preferred method, a mold, as illustrated in Fig. 1, including an apertured body 17, the apertures of which are associated with depending mold forms 18, is utilized. The confection material is poured into the various molds 18. Either before or after filling of the molds, and before final congelation of the confection material, the handles, folded and secured in the receptacle forming position, are inserted in inverted position into the upper ends of the molds 18, as shown in Fig. 1. The configuration of the handles is such as to be snugly received within the molds, thus to be embraced by the sides and retained in position through frictional engagement therewith, preferably in such manner as to prevent confection material from entering between the outer sides of the handles and the mold. The molds are then subjected to refrigeration, or the previously initiated refrigeration is completed. If, as is preferred, the material of the handles is of more or less absorbent nature, part of the fluid of the confection will impregnate the handles, whereby upon congelation, an intimate rigid bond is provided between the confection and the handle. Without such impregnation, however, the freezing confection provides an effective bond with the handle by expansion of the material and frictional union with the large handle area provided, by which they are locked together to permit the handling of the confection solely by manipulation of the handle.

Bonding of the material to the metal walls of the individual molds is preferably broken by dipping the molds into warm water up to the point at which the material is bonded to the receptacle, so that thereafter the confections with handles bonded thereto may be easily removed from the molds by manipulation of the extended gripping portions S, or by inverting the mold and dropping of the completed confections therefrom.

A modification of the invention is illustrated in Fig. 7, in which the confection material 20 is of tapering cross section and is received within a similarly tapering handle receptacle 21, the mouth of which is of smaller cross section than the bottom so that the confection is mechanically keyed therein, regardless of either frozen bond through expansion of confection material within the handle, or of impregnation and freezing. The bottom 22 may be formed by folding of the sides of the receptacle, and thus a pre-formed confection block may be positioned within the receptacle and secured therein by interconnection and cooperating configurations. The grasping members S, as shown in Fig. 2, are not used in this form of the invention, as it will be seen that the receptacle itself will constitute a protecting handle portion. It will be understood that the handles may be pre-formed of molded paper or folded and secured in proper configuration in any desired manner. The use of this modification avoids the dependence upon freezing bonding and provides the advantages as set forth in the objects in a simple, expeditious manner.

From the foregoing, it will be seen that the invention provides a handled confection affording sanitary handling and consumption of the confection material, and which insures a grip between the confection material and the handle by three separate means, either separately or cooperatively acting. The freezing of the confection material in contact with the handle material will insure an interlock therebetween. The expansion of the material during freezing will act to provide a firm, frictional grip between the elements, and mechanical interlocking is provided by the reduced mouth of the receptacle.

It will further be seen that the handle is formed of very inexpensive material which may be easily formed, easily shipped in flat position, and easily destroyed. All modifications of the invention are adapted to provide a large area which may accommodate advertising matter. The method of the invention is easily practiced in an economical and sanitary manner, and the invention may be readily modified by those skilled in the art to provide widely different configurations and artistic appearances of the confection, in conformity with the widely differing and rapidly changing demands of the trade.

It will thus be seen that there is herein described an article, a handle and a method, in which the several features of this invention are embodied, and which attain the various objects of the invention and is well suited to meet the requirements of practical use.

As many changes could be made, and many apparently widely different embodiments of this invention could be made, without departing from the scope thereof, it is intended that all matter contained in the above description or shown in the accompanying drawing shall be interpreted as illustrated and not in a limiting sense.

Having thus described my invention, what I claim as new and desire to secure by Letters Patent, is:

1. A handled confection including a confection body and a handle therefor united therewith, including a receptacle portion united with the body portion of the confection by the reception of a portion of the confection within the receptacle of the handle, said handle further including extending gripping elements formed integral therewith and extending from the receptacle outwardly and away from the confection body.

2. A handle for confections, cut, bent, and formed from a single piece of material comprising receptacle body and a bottom therefor, said bottom being formed by inwardly folded extensions of the body, said handle including gripping members formed by extensions of the side walls of the body.

3. A handled confection comprising a frozen confection body and a handle therefor, said handle including a receptacle which is adapted to receive an end of the frozen body portion, said handle having means formed integrally with the receptacle for providing a movable bottom adapted to be pressed upwardly between the walls of the receptacle to eject the frozen body therefrom and integral means extending downwardly therefrom to provide a gripping member for the handle.

4. A handled confectionery product comprising a frozen confection body and a handle member therefor including a receptacle portion united with the body portion of the confection by the reception of an end of the confection within the receptacle portion, said handle member further including a movable bottom for the receptacle portion formed from oppositely disposed tabs extending from the receptacle and adapted to be folded inwardly between the tabs extending downwardly from the receptacle and forming a gripping member for the handled confection.

5. A handled confectionery product comprising a frozen confection body and a handle member therefor united therewith, said handle member including a receptacle portion united with the body portion of the confection by the reception of a portion of the confection within the receptacle of the handle member, said handle member further including elements formed integrally with the ends of the receptacle adapted to be folded inwardly to form a bottom for the receptacle and having elements formed integrally with the sides of the receptacle and extending outwardly and away from the confection body to form a gripping member for the handle.

GEORGE E. LATHROP.